US007079791B2

(12) United States Patent
Chang et al.

(10) Patent No.: US 7,079,791 B2
(45) Date of Patent: Jul. 18, 2006

(54) APPARATUS FOR REDUCING WARM-UP TIME BY AUXILIARY LIGHT SOURCE AND METHOD FOR THE SAME

(75) Inventors: Jung-Chiao Chang, Taipei (TW); Ming-Der Chou, Taipei (TW); Hsin-Tang Chien, Keelung (TW)

(73) Assignee: Lite-On Technology Corporation, Taipei (TW)

( * ) Notice: Subject to any disclaimer, the term of this patent is extended or adjusted under 35 U.S.C. 154(b) by 186 days.

(21) Appl. No.: 10/814,174

(22) Filed: Apr. 1, 2004

(65) Prior Publication Data

US 2005/0047831 A1 Mar. 3, 2005

(30) Foreign Application Priority Data

Sep. 2, 2003 (TW) .............................. 92124251 A

(51) Int. Cl.
*G03G 15/04* (2006.01)
*H04N 1/04* (2006.01)

(52) U.S. Cl. ........................ 399/220; 358/474; 358/509

(58) Field of Classification Search .................. 399/51, 399/220, 221; 355/20, 69, 70; 358/475, 358/485, 509
See application file for complete search history.

(56) References Cited

U.S. PATENT DOCUMENTS

| | | | | |
|---|---|---|---|---|
| 5,907,742 | A | 5/1999 | Johnson et al. | 399/51 |
| 6,104,510 | A * | 8/2000 | Hu et al. | 358/509 |
| 6,239,884 | B1 * | 5/2001 | Yamamoto | 358/475 |
| 2002/0131094 | A1 * | 9/2002 | Koshimizu et al. | 358/509 |
| 2003/0174371 | A1 * | 9/2003 | Koshimizu et al. | 358/509 |
| 2004/0233481 | A1 * | 11/2004 | Kuan et al. | 358/474 |
| 2004/0233482 | A1 * | 11/2004 | Kuan et al. | 358/474 |

FOREIGN PATENT DOCUMENTS

JP 04-071158 A * 3/1992

* cited by examiner

*Primary Examiner*—Sophia S. Chen
(74) *Attorney, Agent, or Firm*—Birch, Stewart, Kolasch, and Birch, LLP

(57) ABSTRACT

An apparatus for reducing start-up time uses an auxiliary light source and method for the same are proposed. The auxiliary light source has relatively short start-up time to compensate a cold cathode fluorescent lamp (CCFL) with long start-up time. The auxiliary light source is a light emitting device and simultaneously turned on with the CCFL. The light-emitting device is turned off when the output light of the CCFL is stable. Therefore, the light-emitting device with the CCFL can provide stable light source for scanner.

12 Claims, 5 Drawing Sheets

APPARATUS FOR REDUCING WARM-UP TIME BY AUXILIARY LIGHT SOURCE AND METHOD FOR THE SAME

BACKGROUND OF THE INVENTION

This Nonprovisional application claims priority under 35 U.S.C. § 119(a) on patent application No(s). 92124251 filed in Taiwan on Sep. 2, 2003, the entire contents of which are hereby incorporated by reference.

1. Field of the Invention

The present invention relates to an apparatus for reducing warm-up time of a lamp and the method for the same, and particularly to a method for reducing start-up time of a scanner by auxiliary light source.

2. Description of the Related Art

In general operation of a scanner, a light source is needed to illuminate the documents to be scanned in order that the scanned image data of the document can be obtained by an optical image sensor module, such as a CCD module, in the scanner.

In light of the above, the scan quality of the scanner is based on the light source, and therefore scanner manufacturers have paid much attention to researches and developments in the light source of scanners.

In addition, because scanners need the higher luminance, cold cathode fluorescent lamps (CCFLs) are adopted by mostly scanner manufacturers.

In consideration of the illumination quality, when the cold cathode fluorescent lamp is used as a light source, the scanner is designed to start a scan operation only when the cold cathode fluorescent lamp reaches a certain temperature, so the light emitted from the cold cathode fluorescent lamp is stable for scanning. Accordingly, upon turning on a scanner, it usually takes a warm-up time for a cold cathode fluorescent lamp to reach a sufficient temperature for stable illumination. Please refer to FIG. 1, which shows a curve representing the warm-up time to luminance characteristic of a typical cold cathode fluorescent lamp.

At the present time, the typical warm-up time of a cold cathode fluorescent lamp is approximately 90 seconds, which the users are not satisfied with, and hence scanner manufacturers tend to develop techniques for reducing the warm-up time to eliminate the dissatisfaction.

Therefore, a method for rapid warm-up of a cold cathode fluorescent lamp, such as the dual input voltage control scheme disclosed in U.S. Pat. No. 5,907,742, has been developed. That is, higher input voltage level (approximately 12 volts) is used during warm-up period to rapidly heat the cold cathode fluorescent lamp and hence to reach the operating temperature in early time, while lower input voltage level (approximately 8 volts) is used after the warm-up of the lamp. The above control scheme significantly reduces the warm-up time of the cold cathode fluorescent lamp to approximately 30 seconds. However, in order for fast warm-up of the lamp in the method, the cold cathode fluorescent lamp bears a higher current during warm-up period, which results in degradation of the lamp operational life.

Moreover, in order to create two different voltage levels respectively for warm-up period and for operational period, a pulse width modulator circuit which is a complicated circuit design, is provided to control the input voltage.

In addition, the frequency oscillator utilized in the above patent and built-in in the inverter, has an oscillation frequency drifting between 35~45 KHz under different voltages and temperatures. This will consequently cause unstable illumination and hence degrade the scan quality.

An alternative method for fast warm-up of a cold cathode fluorescent lamp is to provide a heating wire to the periphery of the lamp. In this case, the heating wire is wound around the outer surface of the cold cathode fluorescent lamp, and, with the aid of heat generated by the heating wire around the lamp, the lamp temperature may be forced to increase more rapidly to thus achieve the fast warm-up. Although the fast warm-up of the lamp can be well-achieved by this method, an additional component, i.e., the heating wire, is required to be provided to the periphery of the lamp and thus some additional steps must be added to the production process.

Furthermore, providing a heating wire adds up to increased costs, including the component cost and the power consumption cost. The most serious problem is that the heating wire wound around the outer surface of the lamp partially blocks the light emitted from the lamp, which causes uneven illumination distribution of the cold cathode fluorescent lamp and in turn degrade the scan quality.

In view of the above, for rapid warm-up of cold cathode fluorescent lamps, those methods currently used in the art are very limited and still have unsolved problems. Therefore, the inventor has employed technical ideas and developed an innovative invention different from the above-mentioned conventional methods.

SUMMARY OF THE INVENTION

It is the object of the invention to provide an apparatus for reducing start-up time by using a light-emitting device with a fast start-up characteristic as an auxiliary light source.

To achieve the above object, according to the structure of the invention, an image sensor module for a scanner is provided with a cold cathode fluorescent lamp on one side and light-emitting diodes on the other side. The light-emitting diodes, which have fast start-up characteristics, are turned on simultaneously with the cold cathode fluorescent lamp, serving as an auxiliary light source to significantly reduce the start-up time of the scanner.

The method for reducing the start-up time of the scanner comprises the following steps:

(a) Igniting the cold cathode fluorescent lamp and the light-emitting device simultaneously so that the light-emitting device may serve as an auxiliary light source before the cold cathode fluorescent lamp reaches a stable status; and (b) As the time goes, the current supplied to the light-emitting device is adjusted based on the luminance of the cold cathode fluorescent lamp so that the integrated light source for illuminating the surface of the document may be kept stable.

The light source of said light-emitting device is formed by the light from light-emitting diodes.

The light source of said light-emitting device is formed by the light which is emitted from a light-emitting diode and then transmitted through a light guide device.

In said step (b), adjusting the current supplied to the light-emitting device based on the luminance of the cold cathode fluorescent lamp is carried out by decreasing and controlling the current flowing through the light-emitting device based on the increase in luminance of the cold cathode fluorescent lamp after ignition.

BRIEF DESCRIPTION OF THE DRAWINGS

Objects and advantages of the present invention will be fully understood from the detailed description to follow taken in conjunction with the embodiments as illustrated in the accompanying drawings, wherein.

DETAILED DESCRIPTION OF PREFERRED EMBODIMENTS

Figure 1:
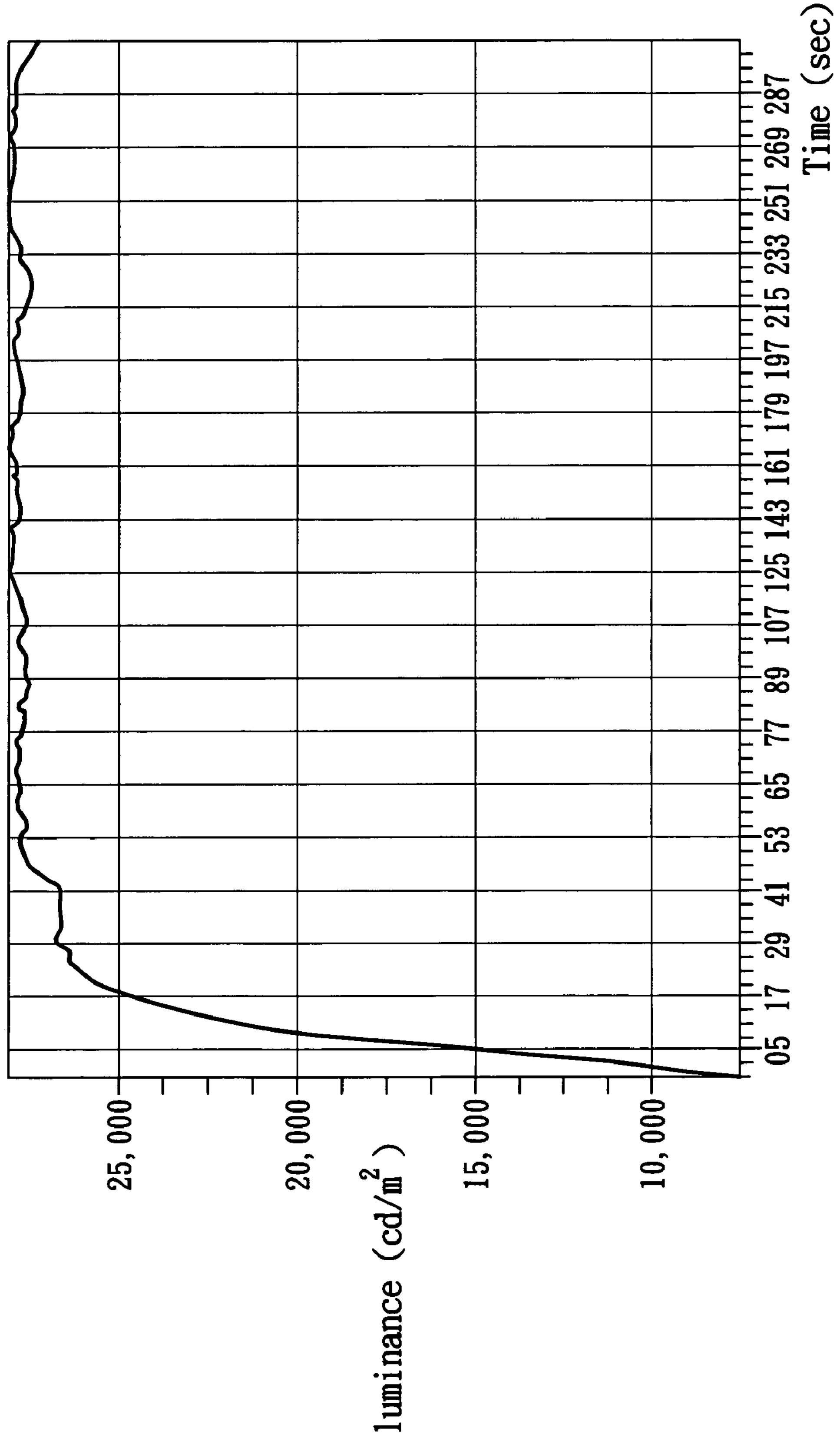
FIG. 1 shows a curve representing the warm-up time to luminance characteristic of a typical cold cathode fluorescent lamp.
Figure 2:
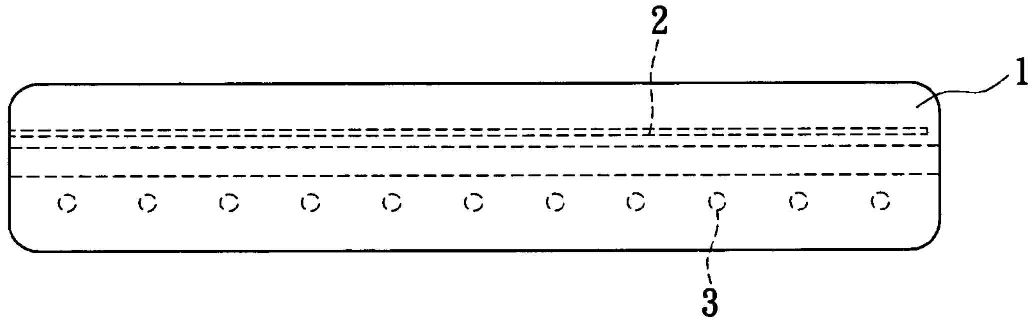
FIG. 2 illustrates a top view of a preferred embodiment according to the present invention.

Please refer to FIG. 2, which shows a top view of a preferred embodiment according to the present invention. An image sensor module 1 for a scanner is provided with a cold cathode fluorescent lamp 2 for illuminating a document reading position on one side and a plurality of light-emitting diodes 3 on the other side. The light-emitting diodes 3 have fast start-up characteristics, and when turned on simultaneously with the cold cathode fluorescent lamp 2, may serve as an auxiliary light source for the cold cathode fluorescent lamp 2 so as to significantly reduce the start-up time of the scanner. The luminance of the integrated light source is detected by using a photo sensor connected to a control circuit (not shown). Thereby, through the operation of the program in the control circuit, the current supplied to the light-emitting diodes 3 can be adjusted based on the detected luminance of the cold cathode fluorescent lamp so that the light source for illuminating a surface of a document may be kept stable.

Figure 3:
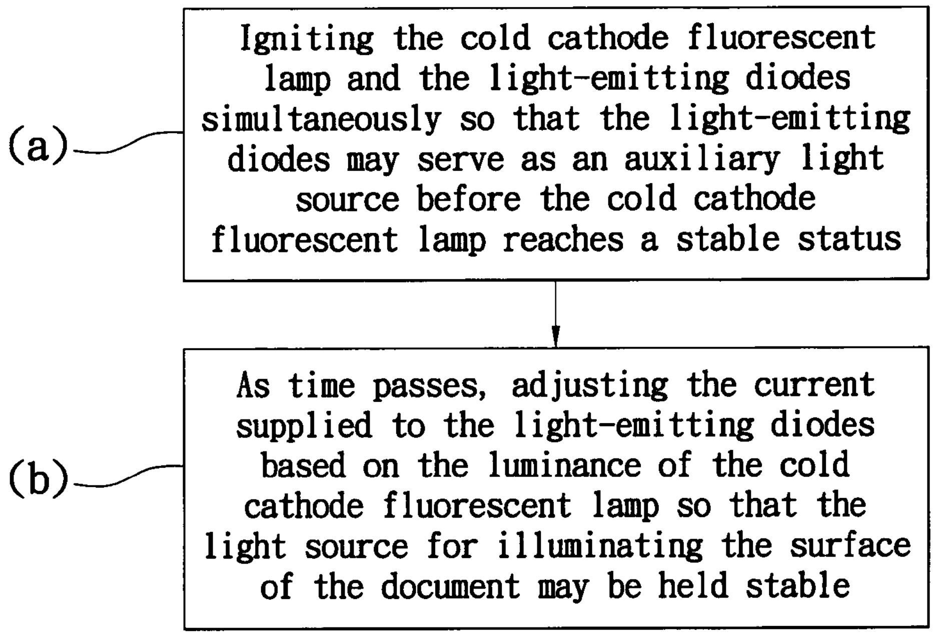
FIG. 3 shows a control flow chart of the present invention.

Reference is made to FIG. 3, a control flow chart of a method for reducing start-up time of a scanner according to the present invention, in relation to the above-mentioned structure together with the program in the control circuit, is shown to comprise the following steps of:

(a) Igniting the cold cathode fluorescent lamp and the light-emitting diodes simultaneously so that the light-emitting diodes may serve as an auxiliary light source before the cold cathode fluorescent lamp reaches a stable status; and (b) As the time goes, the current supplied to the light-emitting diodes is adjusted based on the luminance of the cold cathode fluorescent lamp so that the light source for illuminating the surface of the document may be kept stable, wherein adjusting the current supplied to the light-emitting diodes based on the luminance of the cold cathode fluorescent lamp is carried out by decreasing and controlling the current flowing through the light-emitting diodes based on the increase in luminance of the cold cathode fluorescent lamp after ignition.

Figure 4:
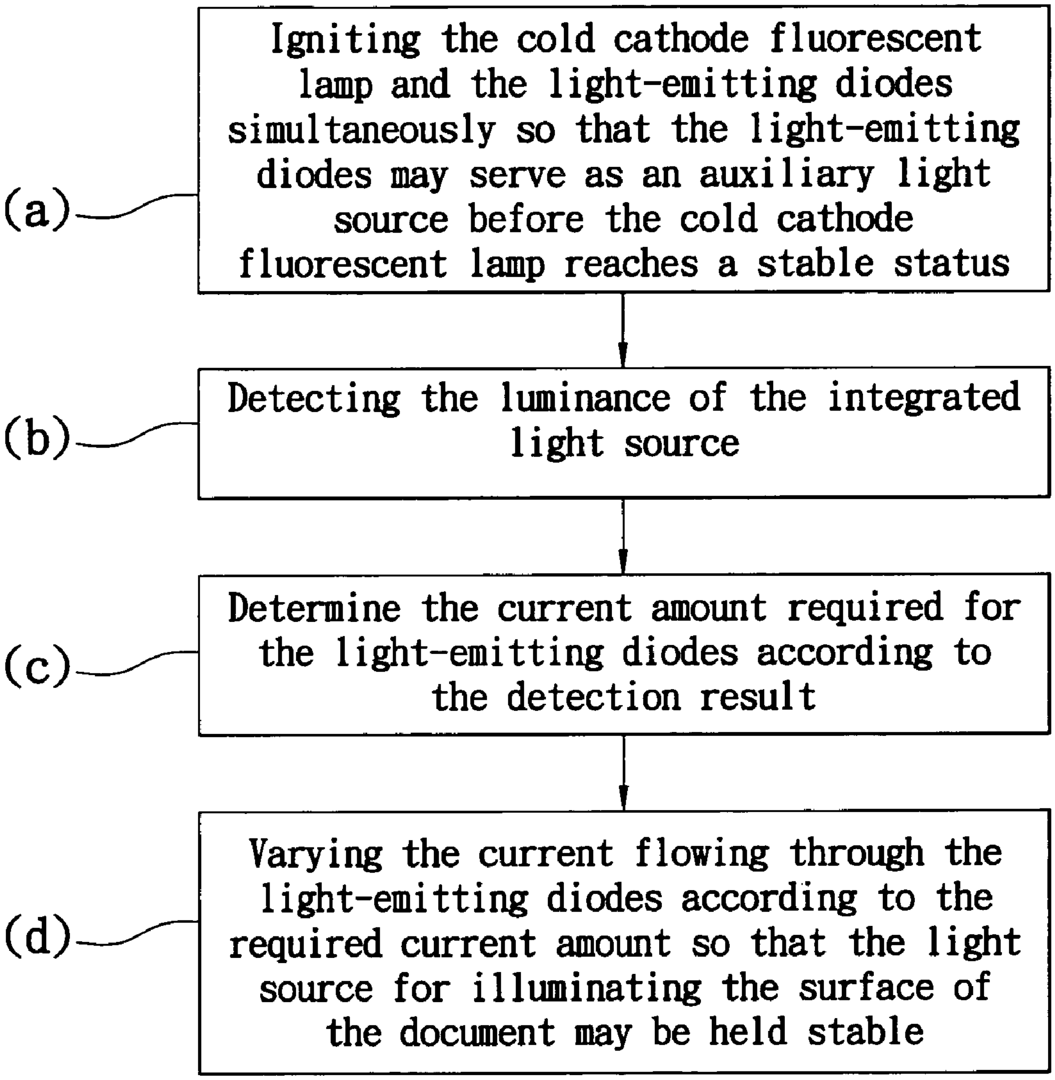
FIG. 4 shows another control flow chart of the present invention.

Reference is made to FIG. 4, another control flow chart of a method for reducing start-up time of a scanner according to the present invention, also in relation to the above-mentioned structure together with the program in the control circuit, is shown to comprise the following steps of:

(a) Igniting the cold cathode fluorescent lamp and the light-emitting diodes simultaneously so that the light-emitting diodes may serve as an auxiliary light source before the cold cathode fluorescent lamp reaches a stable status;

(b) Detecting the luminance of the integrated light source by using a photo sensor;

(c) Determine the current amount required for the light-emitting diodes according to the detection result; and (d) Varying the current flowing through the light-emitting diodes according to the required current amount so that the light source for illuminating the surface of the document may be kept stable.

Figure 5:
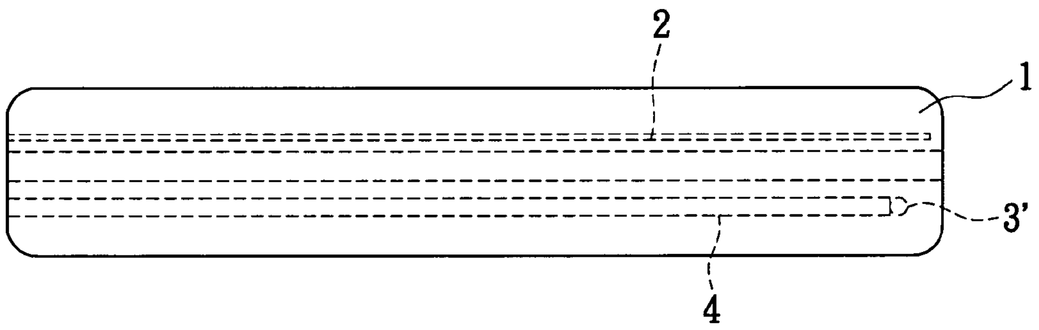
FIG. 5 illustrates a top view of another preferred embodiment according to the present invention.

The afore-mentioned plurality of light-emitting diodes can also be replaced by a light guide device and a light-emitting diode mounted on one side thereof, as shown in FIG. 5. In this case, the auxiliary light source for the cold cathode fluorescent lamp 2 is formed by the light, which is emitted from light-emitting diode 3' and then transmitted through the light guide device 4, to reduce the start-up time of the scanner. As the time goes, the current flowing through the light-emitting diode 3' is decreased and controlled based on the increase in luminance of the cold cathode fluorescent lamp 2 after ignition, so that the light source for illuminating the surface of the document may be kept stable.

In summary, according to the structure of the present invention operated in conjunction with the program, by using a light-emitting device having a fast start-up characteristic as an auxiliary light source, the start-up time of a scanner can be reduced.

While the present invention has been described with reference to the preferred embodiments thereof, it is to be understood that the invention should not be considered as limited thereby. Various modifications and changes could be conceived of by those skilled in the art without departuring from the scope of the present invention, which is indicated by the appended claims.

What is claimed is:

1. A method for reducing a warm-up time of a lamp by using a light-emitting device with a fast start-up characteristic as an auxiliary light source for a cold cathode fluorescent lamp (CCFL) to reduce the start-up time of a scanner, comprising:

(a) igniting said cold cathode fluorescent lamp and said light-emitting device simultaneously so that said light-emitting device may serve as an auxiliary light source before said cold cathode fluorescent lamp reaches a stable status; and (b) as the time goes, the current supplied to said light-emitting device is adjusted based on the luminance of said cold cathode fluorescent lamp so that the light source for illuminating a surface of a document may be kept stable.

2. The method for reducing a warm-up time of a lamp of claim 1, wherein the light source of said light-emitting device is formed by the light from light-emitting diodes.

3. The method for reducing a warm-up time of a lamp of claim 1, wherein the light source of said light-emitting device is formed by the light which emitted from a light-emitting diode and then transmitted through a light guide device.

4. The method for reducing a warm-up time of a lamp of claim 1, wherein the step (b) of adjusting the current supplied to said light-emitting device based on the luminance of said cold cathode fluorescent lamp is carried out by decreasing and controlling the current flowing through said light-emitting device based on the increase in luminance of said cold cathode fluorescent lamp after ignition.

5. A method for reducing a warm-up time of a lamp by using a light-emitting device with a fast start-up characteristic as an auxiliary light source for a cold cathode fluorescent lamp to reduce the start-up time of a scanner, comprising:

igniting said cold cathode fluorescent lamp and said light-emitting device simultaneously so that said light-emitting device may serve as an auxiliary light source before said cold cathode fluorescent lamp reaches a stable status;

detecting the luminance of the light-emitting device and the cold cathode fluorescent lamp;

determining the current amount required for said light-emitting device according to the detection result; and varying the current flowing through said light-emitting device according to the required current amount so that the light source for illuminating the surface of a document may be kept stable.

6. The method for reducing a warm-up time of a lamp of claim 5, wherein the light source of said light-emitting device is formed by the light from light-emitting diodes.

7. The method for reducing a warm-up time of a lamp of claim 5, wherein the light source of said light-emitting device is formed by the light which emitted from a light-emitting diode and then transmitted through a light guide device.

8. An apparatus for reducing a warm-up time of a lamp, comprising:

an image sensor module;

a cold cathode fluorescent lamp provided on one side of said image sensor module; and a plurality of light-emitting devices provided on the other side of said image sensor module to serve as an auxiliary light source for said cold cathode fluorescent lamp when turned on simultaneously with said cold cathode fluorescent lamp to reduce a start-up time of a scanner;

wherein a current supplied to said light-emitting devices is based on a luminance of said cold cathode fluorescent lamp so that a light source for illuminating a surface of a document may be kept stable over time.

9. The apparatus for reducing a warm-up time of a lamp of claim 8, wherein said light-emitting devices are light-emitting diodes.

10. An apparatus for reducing a warm-up time of a lamp, comprising:

an image sensor module;

a cold cathode fluorescent lamp provided on one side of said image sensor module; and a light guide device provided on the other side of said image sensor module, said light guide device being provided with a light-emitting device on one side thereof;

whereby, said light guide device in conjunction with said light-emitting device may serve as an auxiliary light source for said cold cathode fluorescent lamp when said light-emitting device is turned on simultaneously with said cold cathode fluorescent lamp to reduce a start-up time of a scanner, and a current supplied to said light-emitting device is adjusted based on a luminance of said cold cathode fluorescent lamp so that a light source for illuminating a surface of a document may be kept stable over time.

11. The apparatus for reducing a warm-up time of a lamp of claim 10, wherein said light guide device is a light guide plate.

12. The apparatus for reducing a warm-up time of a lamp of claim 10, wherein said light-emitting device is a light-emitting diode.

* * * * *